United States Patent [19]

Duncan et al.

[11] 4,116,471
[45] Sep. 26, 1978

[54] QUICK OPERATING CONNECTOR FOR PIPES OR THE LIKE

[75] Inventors: Anthony Bruce Duncan, Missouri City; Arthur H. T. Chin, Houston, both of Tex.

[73] Assignee: HydroTech International, Inc., Houston, Tex.

[21] Appl. No.: 790,315

[22] Filed: Apr. 25, 1977

[51] Int. Cl.² .............................................. F16L 35/00
[52] U.S. Cl. .......................................... 285/1; 285/18; 285/404
[58] Field of Search .................. 285/18, 403, 404, 317, 285/309, 310, 358, 21, 334, 96, 1

[56] References Cited

U.S. PATENT DOCUMENTS

| | | | |
|---|---|---|---|
| 755,325 | 3/1904 | Soutar | 285/317 X |
| 2,052,394 | 8/1936 | Fullman | 285/404 X |
| 3,345,087 | 10/1967 | Hanes et al. | 285/321 X |
| 4,014,567 | 3/1977 | Arnold et al. | 285/317 X |

FOREIGN PATENT DOCUMENTS 1,282,994  7/1972  United Kingdom ..................... 285/317

*Primary Examiner*—Werner H. Schroeder
*Assistant Examiner*—C. J. Arbes
*Attorney, Agent, or Firm*—James A. Bargfrede

[57] ABSTRACT

A quick operating connector for pipe or the like including a pair of coupling members, each adapted to be connected at one end thereof to one of said pipes. The first coupling member has an annular radially outward extending flange having a forward side and a rearward side with a radially inner portion and a radially outer portion. Both of the portions define the shape of a frustrum having a forwardly facing base, and the slope of the radially inner portion relative to the central axis of first coupling member is greater than that of the radially outer portion. The second coupling member has a housing for receiving the flange in mating engagement therewith. Disposed circumferentially about the housing is a plurality of self-locking cams which are radially inwardly and outwardly movable between a retracted position in which flange is receivable within the housing and an extended position in which the self-locking cams engage the radially inner portion of the flange in self-locking fashion. Disposed intermediate of the self-locking cams is a plurality of non-locking cams which are similarly radially inwardly and outwardly movable, but which engage the radially outer portion of the flange in non-locking fashion. The non-locking cams are adapted for simultaneous and fast movement back and forth between the extended and retracted positions and thereby engage and hold the flange while the more slowly acting locking cams are extended and retracted. To minimize the possibility of damage to the non-locking cams when the self-locking cams are in the retracted position, an override system is provided by which the non-locking cams will automatically become disengaged from the flange in response to tension forces above a predetermined amount applied between the first and second coupling members.

11 Claims, 9 Drawing Figures

QUICK OPERATING CONNECTOR FOR PIPES OR THE LIKE

BACKGROUND OF THE INVENTION (a) Field of the Invention

This invention relates to apparatus for connecting pipes or the like. More specifically, apparatus of this invention is for connecting pipe or the like capable of being connected and disconnected quickly and frequently under difficult conditions.

(b) Description of the Prior Art

In the offshore pipeline construction industry, pipe lines are laid in subsea locations by streaming the same from the after end of lay barges as the lay barges are propelled forwardly through the water. To support the pipe during its movement from the deck of the lay barge into the water, lay barges are provided with rearwardly extending buoyant ramps known as stingers. When laying large diameter pipe in deep water, it is desirable to use a longer stinger than is used with small diameter pipe in shallow water. However, rather than fit the lay barge with several interchangeable stingers of various lengths, it is desirable to provide buoyant extensions which may be connected to and disconnected from the stinger as conditions change. It is therefore necessary that a connector or system of connectors be provided.

One type of connector which has great strength and rigidity, and therefore is potentially well suited for use as a connector for stinger extensions, is the type in which a plurality of self-locking cams carried by one part of the connector engage a radially outwardly extending flange of the other portion of the connector in self-locking fashion. By self-locking is meant that the angle of taper of the cams is such that the cams will remain in engagement with the flange until a retracting force is applied thereto. (This is analogous to a nut on a bolt. The nut exerts an axial force when torque is applied thereto, but when the torque is removed, the nut stays in place.) There are, however, several disadvantages associated with using a connector of the self-locking cam type.

First, the coupling of such connectors is slow. It takes a rather substantial amount of time to seat the cams against the flange, and because the connection would be made in an offshore location where the stinger and extension would be subject to wave action, the connector would be extremely vulnerable to damage during the coupling thereof.

The vulnerability to damage of such connectors is even greater during break-away. Because the self-locking properties of the cams are functions of both the angle of their taper and of the coefficient of friction between the cam surface and the flange, each cam has slightly different properties and therefore each cam requires a different amount of force to retract it from the engaged position. Since the cams are actuated by a single hydraulic system, the tendency is for the cams to unseat randomly, with cams having lower self-locking properties unseating and retracting first while the other cams remain engaged. Consequently, each of the remaining cams is forced to share a greater load, which increases the possibility of damage to the connector by the shearing off of cams. Further, if one connector releases before another, structural damage to the extension and stinger becomes likely.

SUMMARY OF THE INVENTION

It is therefore an object of the present invention to provide a connector having great strength, but capable of being quickly connected and disconnected. It is a further object of the present invention to provide a connector which may be used in combination with other such connectors, all of which may be operated simultaneously. It is a still further object of the present invention to provide a connector that may be overridden by excessive forces without being damaged thereby.

Briefly stated, this invention is for apparatus for connecting the ends of a pair of pipes or the like. The apparatus includes a pair of coupling members, each of which is adapted for connection at one end thereof to the end of one of the pipes or other structure being connected. One of the coupling members is provided at the opposite end thereof with an annular flange extending radially outwardly therefrom and having a forward side and a rearward side with radially inner and outer portions. The other coupling member is provided with a housing arranged for receiving the flange and mating engagement therewith. About the circumference of the housing is carried a multiplicity of cams adapted for movement between a retracted position and an extended position. The cams are of two types: a first plurality are adapted to engage the radially inner portion of the flange in self-locking fashion; a second plurality are adapted to engage the radially outer portion of the flange in non-locking fashion. Means, such as hydraulic piston and cylinder assemblies, are provided for moving the cams between the retracted and extended position. The means for moving the non-locking cams are independent from the means for moving the self-locking cams, and are adapted for quick and simultaneous action. The means for moving the non-locking cams are further adapted to release the cam from engagement with the flange in response to excessive tension forces applied between the coupling members. A seal may be provided at the interface of the flange and the housing so that coupling members can be used to interconnect fluid carrying pipes.

The apparatus of this invention may be used to connect a single pair of pipes, or in combination with a plurality of such apparatus to rigidly interconnect one structure to another, for example an extension to an offshore pipe laying stinger. Whether used singularly or in combination, the sequence of operation of the apparatus is essentially the same. After the coupling members have been mounted, the flange is brought in to generally mating engagement within the housing. When used as a stinger extension connector, the engagement is accomplished by means of cables attached to each of the first coupling members and led through the second coupling members to wenches. When the coupling members so engage, the non-locking cams are extended to capture and hold the stinger in position while the slower acting self-locking structural cams are extended to complete the interconnection. After the self-locking cams are randomly seated, the non-locking cams may be retracted.

To disengage the connector, the non-locking cams are first extended to engage and hold the flange. Then the self-locking cams are actuated to the retracted position. When the self-locking cams are fully retracted, high pressure is applied by an accumulator to retract the non-locking cams and thereby quickly disengage the connectors.

If, during engagement and disengagement, when the coupling members are held together solely by the non-locking cams, tension forces between the coupling members become greater than a predetermined amount, means are provided whereby the non-locking cams will simultaneously release to thereby disengage the coupling members without damage thereto.

DESCRIPTION OF THE PREFERRED EMBODIMENT

Figure 1:
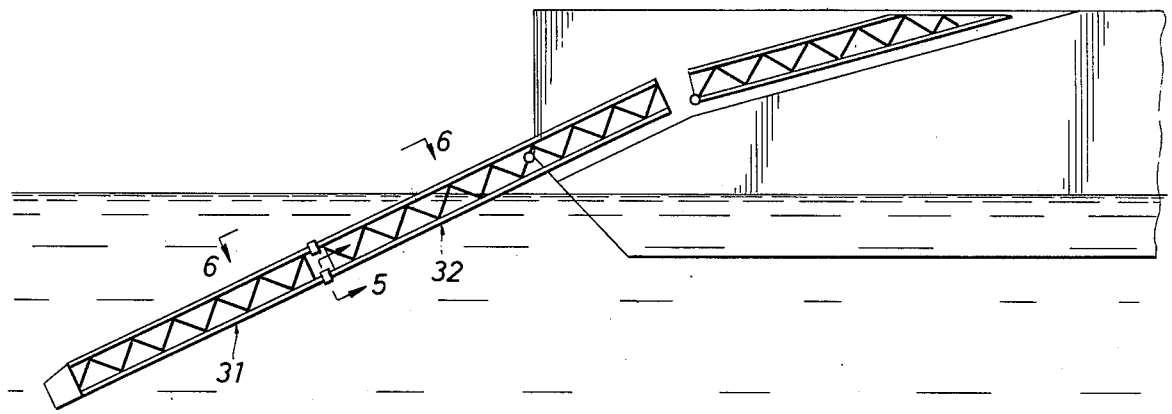
FIG. 1 is a partial side view showing the aft end of lay barge with stinger and stinger extension mounted thereon.

Referring now to the drawings, one presently preferred embodiment of the invention will be described. The apparatus of this invention includes a male coupling member 11 and a female coupling member 12. Coupling member 11 is arranged for connection, as by welding or the like, to one of the pipes or the like which is to be joined, as for example the end of pipe 13. Coupling member 12 is arranged for connection, as by welding or the like, to the other pipe 14 or the like which is to be joined. Coupling member 11 is provided with an annular outwardly extending flange 17 which is provided with a generally frustrum shaped forward side 18 and a rearward side having a radially inner portion 19 and a radially outer portion 20, both portions being generally frustrum shaped. It will be observed that the frustra formed by forward side 18 and portions 19 and 20 of the rearward side have bases which face generally forward toward coupling member 12. In the preferred embodiment, the slope of radially inner portion 19 is at least 80° with respect to the axis of coupling member 11 and is greater than that of the forward side 18, which is on the order of 60°. Thus, flange 17 may be described as being of an asymmetrical dove-tailed cross-section, which provides greater resistance to shear force which might be imposed upon the coupling assembly. The slope of radially outer portion 20 is on the order of 55°, and the significance of the slopes of portions 19 and 20 will be discussed later.

Coupling member 12 is provided with an annular housing 21 having a seating base 22 arranged to matingly receive forward side 18 of flange 17. Seating base 22 and forward side 18 cooperate during engagement of coupling members 11 and 12 to align the axes thereof. Base 22 may be provided with an annular seal 49 to make the connection between members 11 and 12 fluid tight.

Figure 5:
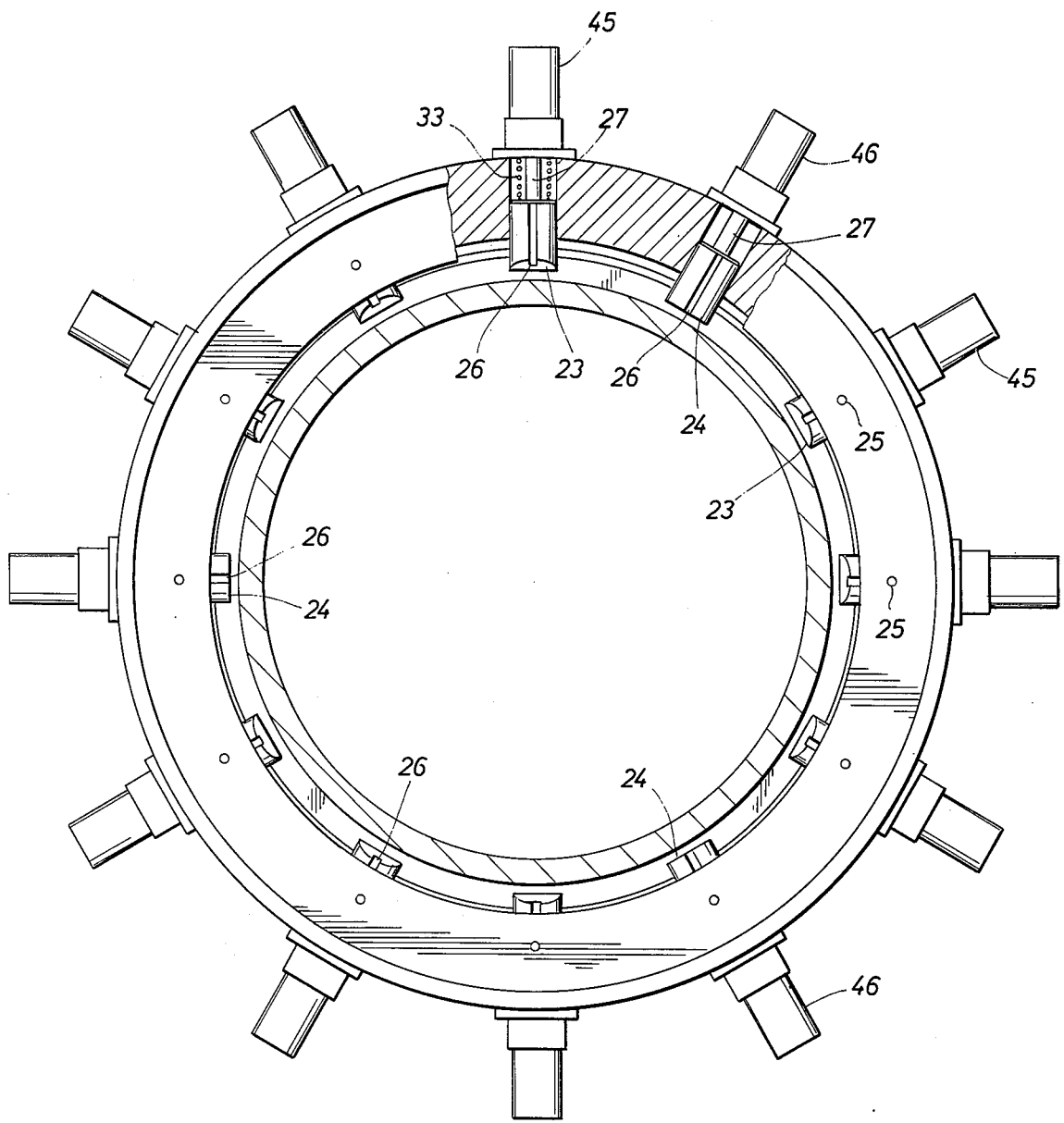
FIG. 5 is an end view taken generally along line 5—5 of FIG. 1, of the apparatus, with a portion of the apparatus shown broken away to reveal additional details of the cam members and associated elements.

Housing 21 is arranged to carry and support a plurality of cams circumferentially spaced thereabout, as generally shown in FIG. 5. In the presently preferred embodiment, twelve cams are provided; however, a greater or lesser number may be provided, the number being dependent on the diameter of the coupling members. Nine of the cams are self-locking and are designated by the numeral 23. The remaining three cams are non-locking, and are designated by the numeral 24. The cams 23 and 24 are generally equally spaced about the circumference of housing 21, with the non-locking cams 24 being spaced approximately 120° apart from one another.

Each of the cams 23 and 24 are arranged for generally radially inward and outward movement in housing 21 and are generally circular in cross-section taken transverse to the direction of movement thereof. Each of the cam members 23 and 24 are held against rotation about the axis of movement by means of a guide pin 25 passing through a portion of housing 21 and engaging a longitudinal guide slot 26 in the rearward side of each cam 24 and 25.

Each cam member 23 and 24 is supported at its radially outward end on a piston rod 27, as by welding, threading or the like, and is arranged for radially inward and outward movement by the operation of a hydraulic piston (not shown) attached to the radially outward end of rod 27, and which piston is arranged to move inside hydraulic cylinder by the application of hydraulic pressure thereto in conventional manner, and which may be operated from a remote location. While all of the cylinders used in the apparatus are substantially identical, for the sake of clarity, those actuating self-locking cams 23 will be designated by the numeral 45, and those actuating non-locking cams will be designated by the numeral 46.

Figure 3:
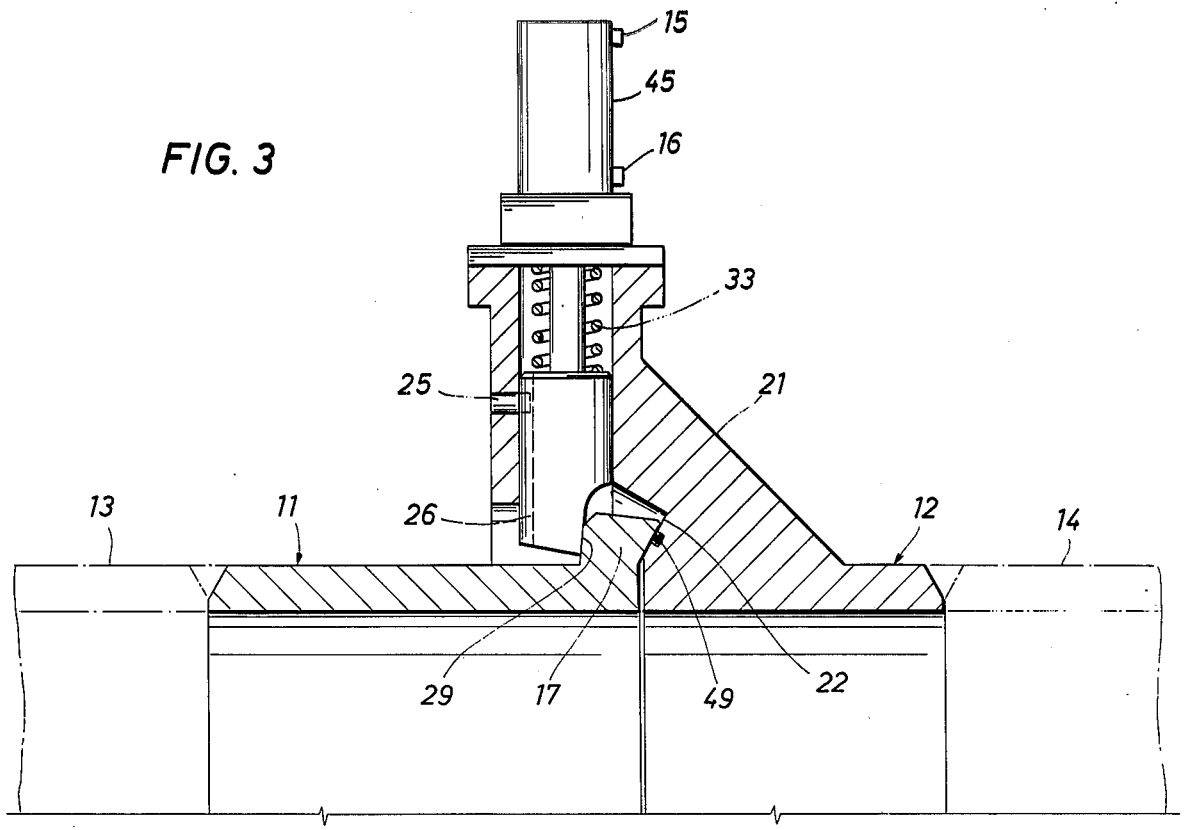
FIG. 3 is a partial, central longitudinal sectional view showing one of the self-locking cams in engagement with the flange.
Figure 4:
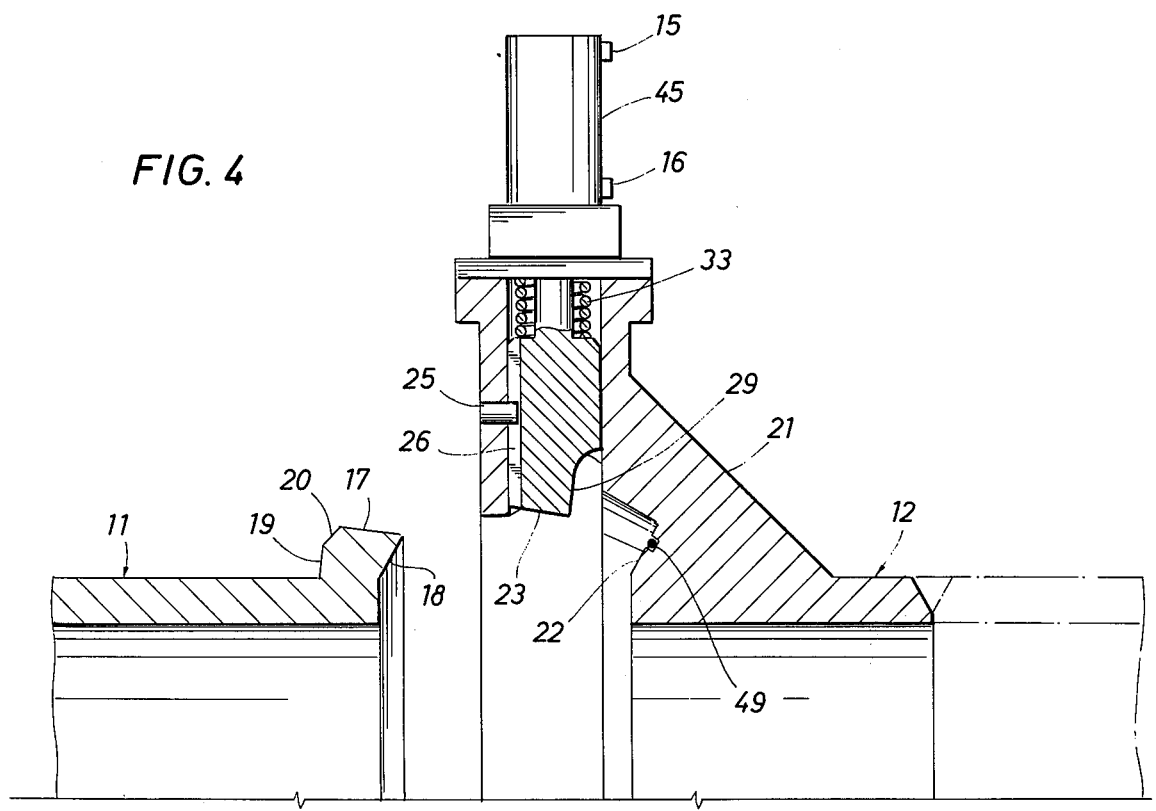
FIG. 4 is a view generally similar to FIG. 3, but showing the two coupling members axially spaced apart just immediately prior or subsequent to the coupling members being placed or having been placed in the joined condition.

The difference between the construction and operation of cams 23 and 24 will now be described in detail. As shown in FIGS. 3 and 4, the lower portion of the forward side of cam 23 has a camming surface 29 which has an angle of taper equal to the slope of radially inner portion 19 of flange 17, and is adapted for engagement therewith in self-locking fashion. The term self-locking means that when camming surface 29 and radially inner portion 19 are engaged, a tension force exerted between coupling members 11 and 12 will have no tendency to urge cam member 23 radially outward. It is contemplated that cam 23 and flange 17 would be made of hardened steel; therefore, camming surface 29 and radially inner portion 19 will engage in self-locking fashion when the slope radially inner portion 19 with respect to the axis of coupling member 11 is greater than about 80°.

Figure 2:
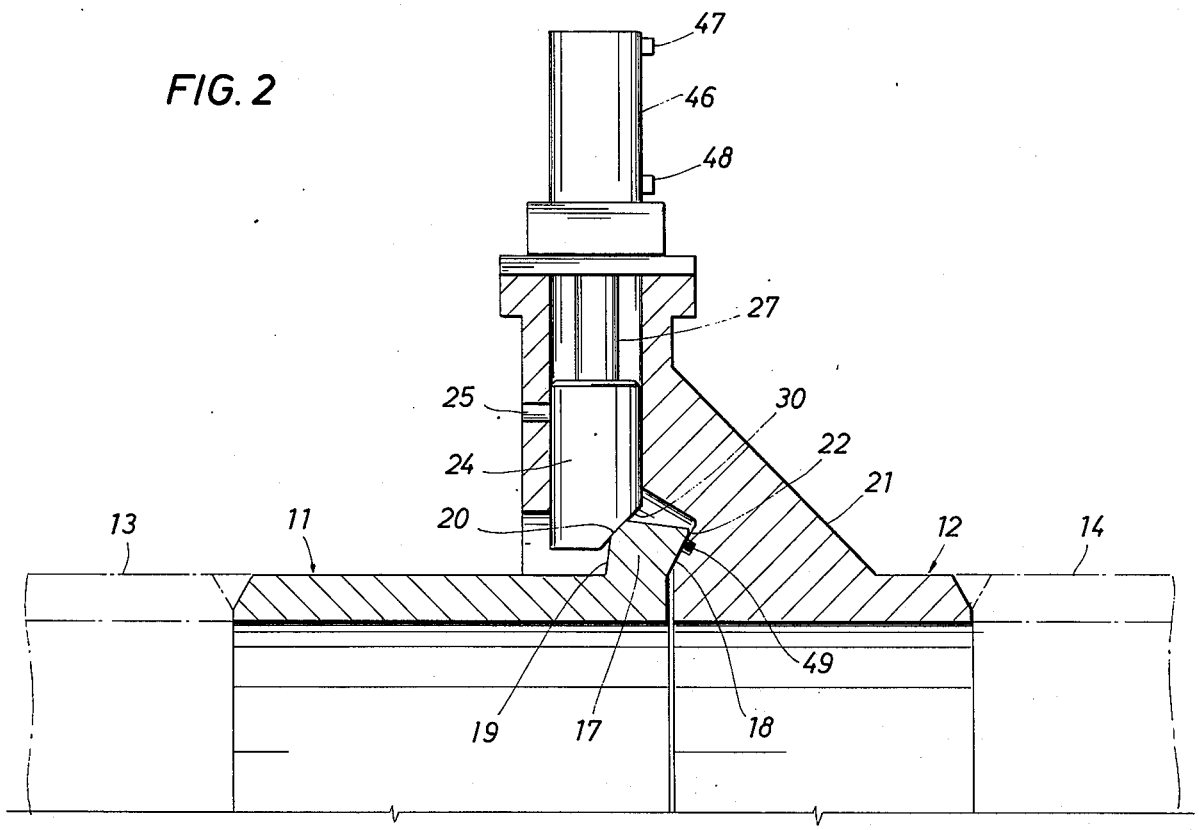
FIG. 2 is a partial, central longitudinal sectional view showing one of the non-locking cams in engagement with the flange.

As shown in FIG. 2, the lower end of the forward portion of cam 24 is provided with a camming surface 30 which has an angle of taper equal to the slope of radially outer portion 20 of flange 17, and is adapted for engagement therewith in non-locking fashion. From the foregoing, it may be seen that camming surface 30 and radially outer portion 20 will engage in non-locking fashion if the slope radially outer portion 20 is less than about 80°. However, in order to increase the radially outward force caused by axial tension between coupling member 11 and 12, in the presently preferred embodiment the slope of radially outer portion 20 is on the order of about 55°.

Figure 9:
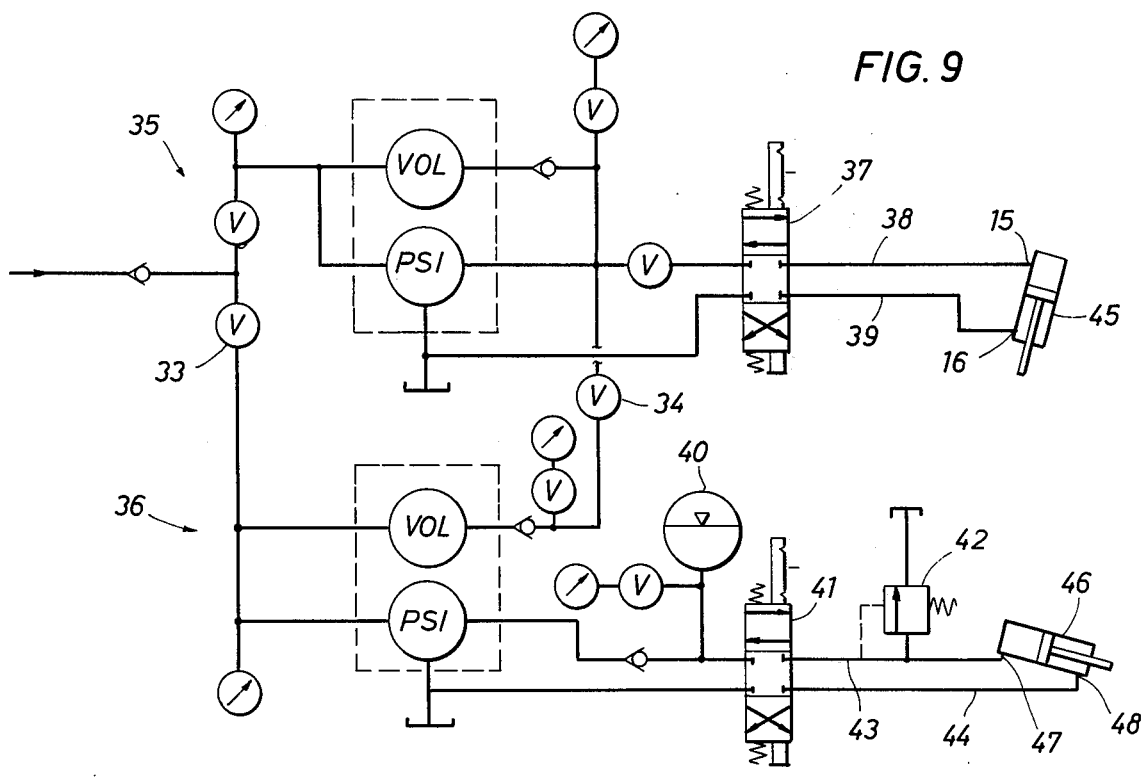
FIG. 9 is a schematic diagram of the hydraulic system used in operating the apparatus.

One hydraulic system which may be used to actuate hydraulic cylinders 45 and 46 of the presently preferred embodiment is illustrated in schematic form in FIG. 9. The system is segregated by valves 33 and 34 into two subsystems 35 and 36. Subsystem 35 is used in the actuation of self-locking cams 23 and subsystem 36 is used in the actuation of non-locking cams 24. Subsystem 35 includes a three position four-way block port center position valve 37. In one open position, pressure is delivered to line 38 which is connected to radially outer inlets 15 of cylinders 45. When in the other open position, valve 37 delivers pressure to line 39, which is connected to inlets 16 of cylinder 45. Thus by appropriate operation of valve 37, self-locking cams 23 may be powered to and from the retracted position.

Subsystem 36 is similar to subsystem 35 in that it includes a similar three position four-way block port center position valve 41. In one open position, valve 41 delivers pressure to line 43 which is attached to inlets 47 of cylinders 46. In the other open position, valve 41 delivers pressure to line 44 which is connected to inlets 48 of cylinders 46. Additionally, subsystem 36 includes an accumulator 40 which is used to deliver high pressure to cylinders 46 via line 44 and inlet 48 to thereby quickly retract non-locking cams 24. Subsystem 36 also includes a relief valve 42 in line 43. Relief valve 42 allows for automatic release of non-locking cams 24 when they are subjected to excessive force, as will be described hereinafter.

In operation, coupling members 11 and 12 are brought into mating engagement by any convenient means, after which non-locking cams 24 are extended by the injection of hydraulic fluid into hydraulic cylinders 46 through inlets 47, to thereby engage radially outer portion 20 and seat flange 17 against base 22. Since cams 24 are non-locking, hydraulic pressure must be maintained within hydraulic cylinders 46 in order for flange 17 to be held thereby. The pressure is maintained by closing valve 41. While flange 17 is thus held by non-locking cams 24, self-locking cams 23 are extended by the injection of hydraulic fluid into cylinders 45 through inlets 15 and brought into engagement with radially inner portion 19 of flange 17. When self-locking cams 23 are firmly seated, the connection is complete and the hydraulic pressure may be relieved in both subsystems 35 and 36. While cams 23 are self-locking and therefore will not tend to retract in response to tension forces between members 11 and 12, certain forces may cause cams 23 to bend or flange 17 to become deformed, thereby loosening the connection. It is therefore desirable to provide means for continuously urging self-locking cams 23 further inward. These means conveniently take the form of compression springs 33.

To disconnect coupling member 11 from coupling member 12, non-locking cams 24 are actuated to engage and hold flange 17, after which self-locking cams 23 are retracted. When self-locking cams 23 have been retracted, non-locking cams 24 are quickly and simultaneously actuated to the retracted position, as described above, thereby quickly releasing flange 17.

To avoid shearing or otherwise damaging non-locking cams 24 after self-locking cams 23 have been retracted, non-locking cams 24 are made to be self releasing in response to tension forces between coupling members 11 and 12 exceeding a predetermined level. Tension between coupling members 11 and 12 is translated by the action of camming surface 30 and radially outer portion 20 into a radially outwardly directed force on non-locking cam 24. This radially outwardly directed force is transmitted by piston rod 27 to hydraulic cylinders 46 and increases the hydraulic pressure within subsystem 36. It is possible, by setting the pressure at which relief valve 42 will operate, to allow non-locking cams 24 to release before damage thereto occurs, which might be 5,000 psi, for example.

Figure 6:
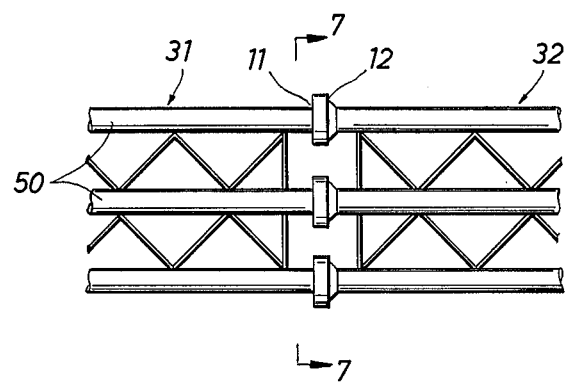
FIG. 6 is a partial plan view taken generally along line 6—6 of FIG. 1 showing the arrangement of the connectors and the stinger extension connector application.
Figure 7:
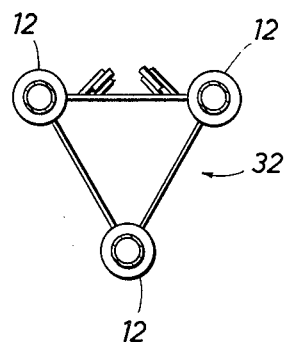
FIG. 7 is an end view taken along line 7—7 of FIG. 6, showing the arrangement of the apparatus and the stinger extension connector application.
Figure 8:
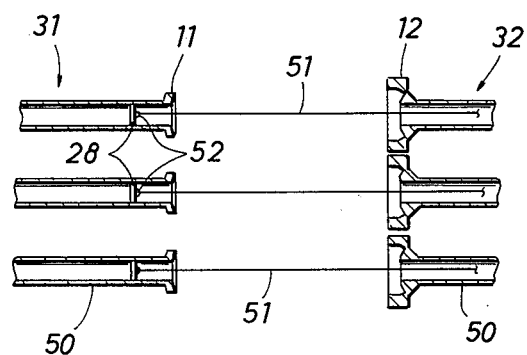
FIG. 8 is a top sectional view similar to FIG. 7 but showing the stinger and extension spaced apart and connected by cables.

To use the apparatus of the present invention in the connection of stinger extensions, coupling members 11 are attached to the end of each cylindrical member 50 stinger extension 31, as shown in FIGS. 6–8. Coupling members 12 are attached to stinger 32 in similar fashion. When it is desired to connect stinger 32 and extension 31, extension 31 is deployed into the water where divers attach cables 51 to padeyes 52 which are attached to plates 28 which blank-off and seal each member 50. Cables 51 are connected through coupling members 12 to wenches (not shown). By operation of the wenches, coupling members 11 may be brought into general mating engagement with coupling members 12. Non-locking cams 24 are then extended and extension 31 is thereby held in place while self-locking cams 23 are extended, thereby rigidly interconnecting stinger 32 and extension 31.

When it is desired to disconnect extension 31 from stinger 32, the wenches associated with cables 51 are operated to put tension on cables 51 and the brakes associated therewith are set. Non-locking cams 24 are then actuated to the extended position and there held in place. Self-locking cams 23 are then actuated to the retracted position. Before cams 23 are retracted, accumulator 40 is pressurized. When selflocking cams 23 are fully retracted, valve 41 is operated to flood hydraulic cylinders 46 and thereby drive non-locking cams 24 to the retracted position. Cables 51 are then allowed to stream out behind stinger 32 where divers disconnect them from padeyes 33. Extension 31 may then be retrieved.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangements of parts. For example, equilavent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for quick releasably connecting a first structure to a second structure, the combination comprising:

a plurality of first coupling members each connected at one end thereof to said first structure, and each having at the other end thereof an annular radially outwardly extending flange having a forward side and a rearward side, said rearward side having a radially inner portion and a radially outer portion, said radially inner portion having a slope relative to the central axis of said first coupling member greater than that of said radially outer portion;

a plurality of second coupling members, each connected at one end thereof to said second structure, and each having at the other end thereof a housing for receiving said flange in mating fashion;

a plurality of self-locking cams disposed circumferentially about each of said housings, said self-locking cams being generally radially inwardly and outwardly movable between a retracted position in which said flange is receivable within said housing and an extended position in which said self-locking cams engage said radially inner portion of said flange in self-locking fashion;

means for actuating said self-locking cams to and from said extended position;

a plurality of non-locking cams disposed circumferentially about each of said housings, said non-locking cams being generally radially movable between a retracted position and an extended position in which said non-locking cams engage said radially outer portion of said flange in non-locking fashion;

a plurality of hydrualic piston and cylinder assemblies disposed circumferentially about each of said housings, said piston and cylinder assemblies being arranged for actuating said non-locking cams to said extended position and holding said non-locking cams in engagement with said radially outer portion of said rearward side of said flange to thereby hold said first and second coupling members together when said self-locking cams are actuated to said retracted position;

and means for substantially simultaneously actuating all of said piston and cylinder assemblies so as to move said non-locking cams on all of said housings to said retracted positions after said self-locking cams have been actuated to said retracted position, to thereby quickly disconnect said first structure from said second structure.

2. The apparatus as claimed in claim 1, including: means for sealing the interface between each of said flanges and each of said housings.

3. The apparatus as claimed in claim 1, including: pressure responsive means associated with said hydraulic piston and cylinder assemblies for simultaneously releasing said non-locking cams from engagement with said radially outer portion of said rearward side of said flange when a tension force above a predetermined amount is applied between first and second coupling members.

4. In apparatus for quick releasably connecting an extension to an offshore pipe line laying stinger, the combination comprising:

a plurality of first coupling members each adapted to be connected at one end thereof to one member of said extension, and each having at the other end thereof an annular radially outwardly extending flange having a forward side and a rearward side, said rearward side having a radially inner portion and a radially outer portion, said radially inner portion having a slope relative to the central axis of said first coupling member greater than that of said radially outer portion;

a plurality of second coupling members each adapted to be connected at one end thereof to a member of said stinger and each having at the other end thereof a housing for receiving said flange in mating fashion;

a plurality of self-locking cams disposed circumferentially about each of said housings, said self-locking cams being generally radially inwardly and outwardly movable between a retracted position in which said flange is receivable with said housing and an extended position in which said self-locking cams engage said radially inner portion of said rearward side of said flange in self-locking fashion;

means for actuating said self-locking cams to and from said extended position;

a plurality of non-locking cams disposed circumferentially about each of said housings, said non-locking cams being generally radially movable between a retracted position and an extended position in which said non-locking cams engage said radially outer portion of said flange in non-locking fashion;

a plurality of hydraulic piston and cylinder assemblies connected to said non-locking cams for moving said non-locking cams to said extended position and for holding said non-locking cams in said extended position, to thereby hold said non-locking cams in engagement with said radially inner portion of said flange;

means associated with said hydraulic piston and cylinder assemblies for substantially simultaneously moving said non-locking cams from said extended position to said retracted position;

and means associated with said hydraulic cylinder and piston assemblies for substantially simultaneous releasing said non-locking cams from said extended position when the pressure within the cylinders of said assemblies exceeds a predetermined level.

5. In apparatus for quick releasably connecting a first pipe end to a second pipe end, the combination comprising:

a first coupling member adapted to be connected at one end thereof to said first pipe end, and having at the other end thereof an annular radially outwardly extending flange having a forward side and first and second rearward sides, said first rearward side having a slope relative to the axis of said first coupling member greater than that of said second rearward side;

a second coupling member adapted to be connected at one end thereof to said second pipe end, and having at the other end thereof a housing adapted to receive said flange in mating fashion;

a seal at the interface of said flange and said housing;

a plurality of self-locking cams disposed circumferentially about said housing and generally radially movable inwardly and outwardly between a retracted position in which said flange is receivable within said housing and an extended position in which said self-locking cams engage said first rearward side of said flange in self-locking fashion;

means for moving said self-locking cams between said retracted and extended positions;

a plurality of non-locking cams disposed circumferentially about said housing, said non-locking cams having a camming surface adapted for flush engagement with said second rearward side, and movable generally radially inwardly and outwardly between a retracted position and an extended position in which said non-locking cams engage said second rearward side;

a plurality of hydraulic piston and cylinder assemblies connected to said non-locking cams for moving said non-locking cams to and from said extended position;

a first source of pressurized hydraulic fluid connected to said hydraulic piston and cylinder assemblies for actuating said hydraulic piston and cylinder assemblies to move said non-locking cams to and hold in said extended position;

a second source of pressurized fluid connected to said hydraulic piston assemblies for actuating said hydraulic piston and cylinder assemblies to move said non-locking cams to said retracted position;

and a relief valve associated with said first source of hydraulic fluid adapted to release the pressure in said first source of hydraulic fluid when the pressure associated with said source exceeds a predetermined amount, thereby releasing said non-locking cams for engagement with said second rearward side when forces tending to pull said coupling members apart exceed predetermined amount.

6. In a quick release connector for pipe or the like, the combination comprising:

a first coupling member having an annular radially outwardly extending flange, said flange having forward and rearward sides, said rearward side of said flange having a radially inner portion and a radially outer portion, said radially inner portion having a slope relative to the axis of said first coupling member greater than that of said radially outer portion;

a second coupling member having a housing for receiving said flange in mating engagement therewith;

a multiplicity of cams disposed circumferentially about said housing, said cams being generally radially inwardly and outwardly movable between a retracted position in which said flange is receivable within said housing and an extended position in which said cams engage said rearward side of said flange, with a first plurality of said cams each having a self-locking camming surface engagable with said rearward side, and a second plurality of said cams each having a non-locking camming surface engagable with said rearward side; and means for separately actuating said first plurality and said second plurality of said cams to and from said extended positions so that said connector is quickly releasably by first retracting said first plurality of said cams and subsequently retracting said second plurality of said cams.

7. The apparatus as claimed in claim 6 wherein:

the angle of said camming surface of said first plurality of cams, relative to the central axis of said second coupling member, is substantially equal to the slope of said radially inner portion of said rearward side of said flange relative to said axis of said first coupling member.

8. The apparatus as claimed in claim 6 wherein:

the angle of said camming surface of said second plurality of cams, relative to said central axis of second coupling member, is substantially equal to said slope of said radially outer portion of said rearward side of said flange relative to said axis of said first coupling member.

9. The apparatus as claimed in claim 6 wherein:

said means for actuating said second plurality of cams includes hydraulic piston and cylinder assemblies to apply a force for holding said cams in the extended position in engagement with said radially outer portion of said rearward side of said flange during and after the retraction of said first plurality of cams.

10. The apparatus as claimed in claim 9, including:

means for controlling the amount of force applied to hold said second plurality of cams in the extended position such that tension forces exerted between said members above a predetermined amount will permit axial separations of said members without damage to the connector.

11. The apparatus as claimed in claim 10 wherein:

said controlling means includes a pressurized hydraulic system connected to said hydraulic piston and cylinder assemblies, with said system having a relief valve therein.

* * * * *